Patented Jan. 2, 1951

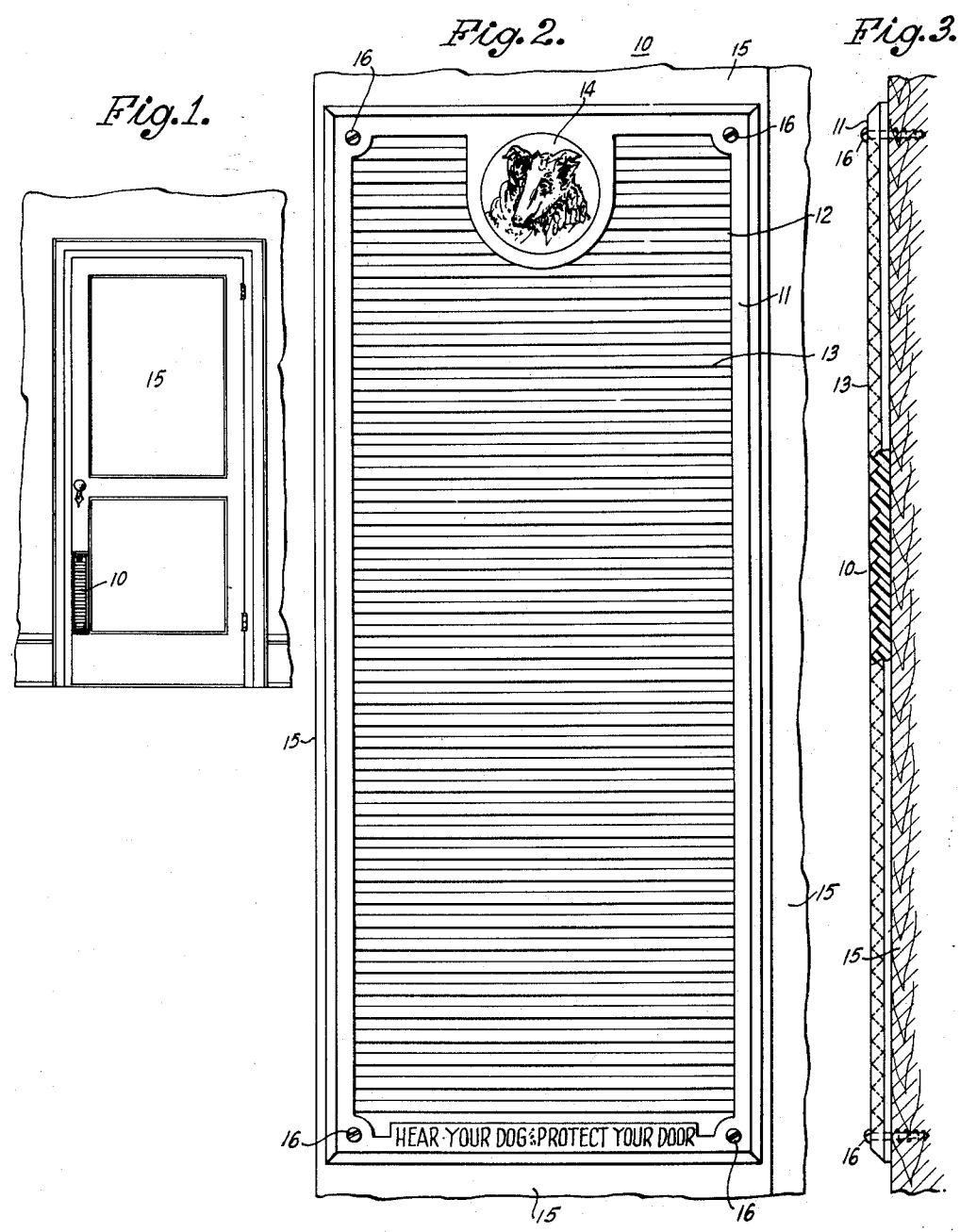

2,536,460

UNITED STATES PATENT OFFICE 2,536,460

ANIMAL SCRATCH PLATE

John B. Paardecamp, Millburn, N. J.

Application April 24, 1948, Serial No. 23,079

2 Claims. (Cl. 116—1)

This invention relates to door protective devices and more specifically to dog scratch plates adapted to be applied to doors.

It is an object of this invention to protect doors from the scratches of dogs and other pets.

It is another object of this invention to provide novel means whereby a dog may audibly make his presence known by scratching thereon.

It is the custom of many dog owners to allow their pets to romp in the front or back yard for fresh air, exercise, etc. When the dog is ready to come into the house, he usually scratches on the door to attract attention, and generally the scratches are confined to a relatively small area on the door. In time, the scratches become deep grooves and the paint is thereby removed from this area. Frequently, the owner of the dog does not hear the scratching and the dog scratches the door for even longer periods, causing even more and deeper grooves therein. If not soon heard by those within the house, the dog finally starts to bark, much to the annoyance of the neighbors.

It is a further object of this invention to prevent the undesirable results described above.

These and other objects are attained in accordance with the invention by providing a dog scratch plate which can be attached to the area of the door which the dog is accustomed to scratch when he desires to reenter the house. This scratch plate has ridges which produce an audible sound when the dog's claws are moved thereover. Thus the device in accordance with this invention has a double function, (1) to protect the door at the spot where the dog would normally scratch and (2) to provide an audible means whereby the owner or other person within the house is aware that the dog wishes to get in.

The invention will be more readily understood by referring to the following description taken in connection with the accompanying drawings forming a part thereof, in which:

Fig. 1 is a front view of a door showing mounted thereon the scratch plate in accordance with the invention;

Fig. 2 is a front view, to a larger scale, of the scratch plate and portions of the door; and Fig. 3 is a side view of the scratch plate showing one way in which it can be attached to the door.

Referring more specifically to the drawings, Figs. 2 and 3 show, by way of example for purposes of illustration and in front and side view, respectively, a dog scratch plate 10 in accordance with this invention. The plate is made of any suitable material, such as metal or plastic, but preferably it is made from plastic material by injection molding. The plate 10 comprises a frame portion 11 and an inner portion 12 provided with a plurality of horizontally disposed ridges 13. The ridges 13 may be of any suitable form and have either sharp or rounded peaks. The purpose of the ridges is to make possible the formation of an audible signal when the dog lifts his foot and scratches the plate with an up and down motion. Moreover, by thus using the plate instead of the unprotected portion of the door, the finish of the door is preserved.

At the top of the plate, there may be, if desired, a medallion 14 showing a dog's head, for example. If the injection molding technique is used, the medallion can be formed by a removable insert in the injection die. By changing this insert, some of the plates 10 can be provided with a collie's head, others with that of a spaniel and still others with a likeness of a terrier, for example. By using a sufficient variety, nearly every owner can purchase a plate provided with a likeness of his own pet.

The plate 10 can be attached to the door 15 by any suitable means such as by screws 16. Fig. 1 shows the plate in position on the door. It will be understood, of course, that the position may be adjusted for the height of the dog.

Various changes can be made in the embodiment described above without departing from the spirit of the invention, the scope of which is indicated in the appended claims. In general, the shape and size of the plate and of the ridges thereon are immaterial and can be considerably changed from those shown in the drawing.

What is claimed is:

1. An animal scratch plate adapted to be attached to a door, comprising a flat plate with a plurality of horizontal ridges thereon, said plate being of material which produces a clearly audible sound when scratched by the animal's claws.

2. An animal scratch plate adapted to be attached to a door, comprising a flat plate with a plurality of horizontal ridges thereon, said plate being of thermoplastic material.

JOHN B. PAARDECAMP.

REFERENCES CITED

The following references are of record in the file of this patent:

UNITED STATES PATENTS

| Number | Name | Date |
|---|---|---|
| 1,709,911 | Hyams | Apr. 23, 1929 |
| 2,287,183 | Lively | June 23, 1942 |